United States Patent Office 3,225,011
Patented Dec. 21, 1965

3,225,011
PROCESS FOR PREPARING POLY-PARA-AMINO-BENZOIC ACID
Jack Preston, Raleigh, and Ralph W. Smith, Durham, N.C., assignors to Monsanto Company, a corporation of Delaware
No Drawing. Filed Sept. 11, 1962, Ser. No. 222,934
17 Claims. (Cl. 260—78)

This invention relates to new synthetic linear condensation polymers. More particularly, the invention relates to high molecular weight thermally resistant poly-p-amino-benzoic acid and to a process for its preparation.

The demand for polyamides of high temperature stability has intensified research in the field of aromatic polyamides since aromatic diacids and aromatic diamines in polymers show higher thermal stability than do aliphatic diacids and aliphatic diamines or mixed aromatic-aliphatic polyamides. High molecular weight, temperature resistant, wholly aromatic polyamides wherein both functional groups are attached directly to the same aromatic ring would be highly desirable since they would be expected to have many desirable properties useful in temperature resistant applications and end uses. Wholly aromatic polyamides cannot be prepared by methods usually employed in the production of most polyamides. Melt polymerization is not adaptable because the high temperatures required to conduct the reaction result in degradation of the intermediates, low molecular weight polymer or none at all, by-product formation and cross-linking with resulting discoloration and insolubility. Low temperature reactions below 50° C. using highly reactive monomers such as diamines and acid halides have been attempted but still result in by-product formation, hydrolysis and other undesirable features. A process for preparing wholly aromatic polyamides is disclosed in U.S. Patent 3,006,899, but is applicable only to aromatic polyamides prepared by reaction of two monomers, an aromatic diamine and an aromatic diacid chloride, each containing one of the amide forming functional groups rather than aromatic polyamides which might be prepared by homopolymerization of one monomer which contained both of the amide forming functional groups attached directly to a single aromatic ring.

In copending application, S.N. 146,011 to Huffman, et al., there is disclosed a process for the preparation of wholly aromatic polyamides from a monomer, such as the amine salt of an aromatic acid halide, which has both functional groups attached directly to the ring. However, the process revealed therein is limited to the preparation of *meta* oriented polymers only. Attempts to prepare *para* derivatives by this process apparently resulted in the monomer reacting with water and forming p-aminobenzoic acid hydrochloride. The preparation of a polyamide from p-aminobenzoic acid by heating would normally decarboxylate the amino acid to aniline. Condensation of p-thionylaminobenzoyl chloride was reported by Riesz in Revista de la Facultad de Humanidades y Ciencias. Universidad de Montevideo 2, No. 3, pp. 65–73 (1948), but resulted in the preparation of dimers, trimers and other low molecular weight oligomers rather than the preparation of high molecular weight polymer.

It is an object of the present invention to provide new compositions of matter. Another object of the invention is to provide poly-p-aminobenzoic acid polymers which are suitable for the production of filaments, fibers and films. Still another object of the invention is to provide a process for the preparation of high molecular weight thermally resistant poly-p-aminobenzoic acid. Other objects and advantages will become apparent from the description of the invention hereinafter.

In general, the objects of the invention are accomplished by preparing a monomer which may be an arylsulfonate salt of a p-aminobenzoyl halide, an amine hydrohalide salt of a p-aminobenzoyl halide or the hydrohalide salt of a p-aminobenzoyl halide for the polymerization process by dispersing the molecules of the monomer in finely divided form either by mechanically grinding the monomer to a fine powder or by mixing it with a suitable non-aqueous dispersant. The dispersed monomer is then reacted with a tertiary amine or any other suitable acid acceptor that will form a salt only with the hydrochloric acid or other by-product of the reaction while undergoing vigorous agitation. The reaction may take place at room temperatures and is usually completed by about 20 to 30 minutes although longer reaction times may be necessary in some instances where a large amount of very high molecular weight polymer is desired. The reaction must be conducted in a non-aqueous environment to prevent hydrolysis of the monomer. The resulting polymer is then washed free of all acidic materials, unreacted ingredients and dried.

The monomers which may be polymerized according to the process of the invention to produce poly-p-aminobenzoic acid may be represented by the general formula

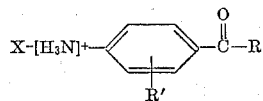

wherein X is taken from the group consisting of chlorine, bromine, sulfate and arylsulfonate, R is a halogen such as chloro or bromo and R' may be any group or radical which is inert in the polymerization reaction such as hydrogen, halogen, aryl, lower alkoxy, nitro or an alkyl radical containing from 1 to 2 carbon atoms. The preparation of these monomers may follow the prior art practices as disclosed in the above noted reference of Riesz. As examples of such monomers, there may be mentioned the hydrohalide salts of p-amino-benzoyl halides and ring substituted derivatives thereof, for example, p-aminobenzoyl bromide hydrochloride,
p-aminobenzoyl bromide hydrobromide,
3-methyl-4-aminobenzoyl chloride hydrochloride,
3-chloro-4-aminobenzoyl chloride hydrochloride,
3-nitro-4-aminobenzoyl chloride hydrochloride,
3-fluoro-4-aminobenzoyl chloride hydrochloride,
3-bromo-4-aminobenzoyl chloride hydrochloride,
2-fluoro-4-aminobenzoyl chloride hydrochloride,
3-ethyl-4-aminobenzoyl chloride hydrochloride,
3-phenyl-4-aminobenzoyl chloride hydrochloride,
2-phenyl-4-aminobenzoyl chloride hydrochloride,
2-ethyl-4-aminobenzoyl chloride hydrochloride,
2-methyl-4-aminobenzoyl chloride hydrochloride,
2-chloro-4-aminobenzoyl chloride hydrochloride, and
2-nitro-4-aminobenzoyl chloride hydrochloride.

Futher suitable monomers include the arylsulfonate salts of p-aminobenzoyl halides, such as, 4-aminobenzoyl chloride p-toluenesulfonate,
4-aminobenzoyl chloride benzenesulfonate,
4-aminobenzoyl bromide p-toluene-sulfonate,
4-aminobenzoyl bromide benzenesulfonate,
3-methyl-4-aminobenzoyl chloride hydrochloride,
3-ethyl-4-aminobenzoyl chloride hydrochloride,
2-methyl-4-aminobenzoyl chloride benzenesulfonate, and
2-phenyl-3-aminobenzoyl bromide benzenesulfonate.

Other suitable monomers include the amine hydrohalide salts of benzenesulfonyl halides and ring substituted derivatives thereof, for example, 4-aminobenzenesulfonyl chloride hydrochloride,
3-methyl-4-aminobenzenesulfonyl chloride hydrochloride, 3-ethyl-4-aminobenzenesulfonyl chloride hydrochloride,
2-methyl-4-aminobenzenesulfonyl chloride hydrochloride,
2-nitro-4-aminobenzenesulfonyl chloride hydrochloride,
2-chloro-4-amino-benzenesulfonyl chloride hydrochloride,
3-nitro-4-aminobenzenesulfonyl chloride hydrochloride,
3-phenyl-4-aminobenzenesulfonyl chloride hydrochloride,
3-chloro-4-aminobenzenesulfonyl chloride hydrochloride, and
2-ethyl-4-aminobenzenesulfonyl chloride hydrochloride.

Still other suitable monomers include the arylsulfonate salts of benzenesulfonyl halides, for example, 4-aminobenzenesulfonyl chloride p-toluenesulfonate,
4-aminobenzenesulfonyl bromide p-toluenesulfonate,
2-methyl-4-aminobenzenesulfonyl chloride p-toluenesulfonate,
3-methyl-4-aminobenzenesulfonyl chloride p-toluenesulfonate,
2-ethyl-4-aminobenzenesulfonyl chloride p-toluenesulfonate, and
2-chloro-4-aminobenzenesulfonyl chloride p-toluenesulfonate.

For effective polymerization to high molecular weight polymer it is preferred but not essential that a suitable non-aqueous dispersant be employed to disseminate and disperse the monomer particles to enable faster and more efficient reaction of the monomer particles with the tertiary amine proton acceptor. The use of such a dispersant also facilitates the vigorous stirring that must take place during the addition of the monomer to the tertiary amine proton acceptor. Suitable dispersants which successfully disperse the monomer should also be miscible with the acid acceptor to form one phase or solution. Compounds which function in this desired manner include cyclic monooxy and di-oxy ethers containing up to 5 carbon atoms such as 1,3-dioxane, 1,4-dioxane, 1,3-dioxolane, 2-methyl-1,3-dioxolane, propylene dioxide, 1,2-dioxocane, ethylene oxide, trimethylene oxide and tetrahydrofuran. The preferred dispersant is tetrahydrofuran.

After the monomer is thoroughly dispersed, it is mixed with a proton acceptor and the polymerization reaction is completed shortly thereafter. The proton acceptor must be a compound which will react with the acidic by-product of the reaction to form an inert salt but does not react with the carbonyl portion of the monomer to terminate the polymerization reaction. Organic tertiary amines are effective proton acceptors since they form, for example, an amine hydrochloride salt. On the other hand, primary and secondary amines are not operable since they contain one or more reactive hydrogens and will react with the carbonyl radical to form chain terminating compounds. Suitable alkyl, aryl, and heterocyclic tertiary amines and diamines include trimethyl amine, triethyl amine, tripropyl amine, dimethyl ethyl amine, triisopropyl amine, triphenyl amine, piperidine, 2-methylpiperidine, 3-methylpiperidine, piperazine, triethylene diamine, pyridine, 2-methylpyridine, 3-methylpyridine, 4-methylpyridine and the like. The acid acceptor is employed in an amount which will, of course, vary with the amount of monomer to be polymerized slightly in excess of the theoretical amount necessary to neutralize any acid formed during the reaction.

It has been found that the polymerization reaction must be conducted in a totally non-aqueous environment. The monomer, dispersant and proton acceptor must be free of water in order for the production of high molecular weight poly-p-benzamide to be accomplished. Attempts to prepare poly-p-benzamide by using aqueous interfacial systems apparently results in reaction of the monomer with water to form p-aminobenzoic acid hydrochloride. Efforts were made, as illustrated by Examples II and III, to decrease the solubility of the monomer in the aqueous phase and hence possibly decrease the hydrolysis of the monomer. These routes also proved unfeasible.

The process of this invention is especially advantageous in that it is a non-aqueous single phase system which is easily and economically operable yielding polymer of good color in high yield suitable for many end uses.

The poly-p-aminobenzoic acid of this invention may be used to prepare copolymers with suitable copolymerizable difunctional compounds. These polymers may also be used with copolymers to prepare blends containing poly-p-benzamide units. For example, the diamines and di-acid chlorides, or aminoacid chloride hydrochlorides used to prepare polymers such as poly-hexamethylene terephthalamide, polyhexamethylene adipamide, polyhexamethylene sebacamide, poly-m-benzamide, poly-m-phenylene isophthalamide and the polyamide of 2,4-toluene diamine and isophthaloyl chloride, may be copolymerized with poly-p-aminobenzoic acid monomers to produce polymers for various textile and other end uses.

To further illustrate the present invention and the advantages thereof, the following specific examples are given, it being understood that these are merely intended to be illustrative. In the examples all parts and percents are by weight unless otherwise indicated. Values of inherent viscosity are determined in sulfuric acid at 25° C. at a concentration of 0.5 gram of polymer per 100 ml. of solution.

EXAMPLE I

To a dry flask fitted with a stirrer and an addition funnel was added approximately 0.05 mole of p-aminobenzoyl chloride hydrochloride. Then 50 ml. of dry dioxane was mixed with the monomer to form a slurry. Next, 50 ml. of dry pyridine was added rapidly to the vigorously stirred solution. An intense orange color developed in the flask but the mixture slowly turned yellow then white. The mixture was stirred for an hour then washed and filtered twice using water and then methanol. The polymer was dried and treated with sodium bicarbonate solution to make certain that all acid materials were removed. After drying the polymer to constant weight, it was submitted for differential thermal analysis (DTA). The DTA graph showed poly-p-aminobenzoic acid to be very heat stable up to its melting point of 503° C. Thermogravimetrical analysis (TGA) showed that little weight loss occurred upon heating poly-p-benzamide until a temperature of around 400° C. was reached and no substantial weight loss until near 500° C. The polymer had an inherent viscosity of 0.76.

EXAMPLE II

This example illustrates an attempted interfacial polymerization of poly-p-aminobenzoic acid to counteract the hydrolysis action by saturating the aqueous phase. An emulsion was prepared from 50 mls. of water saturated with sodium chloride, 10.0 g. sodium carbonate, 0.1 g. sodium lauryl sulfate and 25 ml. of tetrahydrofuran (THF). To the emulsion was added a slurry of 9 mls. THF, 17 mls. benzonitrile, and 9.6 g. p-aminobenzoyl chloride hydrochloride. The mixture was stirred rapidly for 15 minutes and the poduct washed in hot water and dried. Only about 0.2 g. of a low molecular weight, discolored polymeric like substance was isolated.

EXAMPLE III

The experiment of Example II was repeated but a solution of 25 g. of $CaCl_2$ in 100 ml. of water was used for the aqueous phase. A low molecular weight product, slightly purplish in color, was obtained in a 2.5 g. yield.

As many variations of this invention may be made without departing from the spirit and scope thereof, it is to be understood that the invention is not limited to the specific embodiments thereof except as defined in the appended claims.

We claim:
1. A process for the preparation of poly-p-aminobenzoic acid comprising reacting a monomer in disperse form having the general formula:

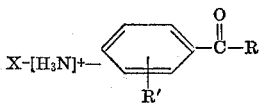

wherein X is selected from the group consisting of chlorine, bromine, sulfate and arylsulfonate, R is a halogen radical, and R' is selected from the group consisting of hydrogen, halogen, aryl, nitro, alkyl and lower alkoxy, in the presence of a tertiary amine under anhydrous conditions with agitation to produce poly-p-aminobenzoic acid having an inherent viscosity of at least 0.6 as measured in sulfuric acid at 25° C. at a concentration of 0.5 gram of polymer per 100 milliliters of solution.

2. The process of claim 1 wherein X is chlorine and R' is hydrogen.

3. The process of claim 1 wherein X is bromine and R' is hydrogen.

4. The process of claim 1 wherein X is sulfate and R' is hydrogen.

5. The process of claim 1 wherein the tertiary amine is pyridine.

6. The process of claim 1 wherein the tertiary amine is trimethyl amine.

7. The process of claim 1 wherein the tertiary amine is triethyl amine.

8. The process of claim 1 wherein the tertiary amine is triethylene diamine.

9. The process of claim 1 wherein the tertiary amine is 4-methylpyridine.

10. The process of claim 1 wherein R is chlorine.

11. The process of claim 1 wherein R is bromine.

12. The process of claim 2 wherein X is arylsulfonate and R' is hydrogen.

13. The process of claim 1 wherein X is chlorine and R' is methyl.

14. The process of claim 1 wherein the monomer is dispersed in a cyclic oxy-ether containing up to 5 carbon atoms.

15. The process of claim 14 wherein the oxy-ether is 1,4-dioxane.

16. The process of claim 14 wherein the oxy-ether is 1,3-dioxane.

17. The process of claim 14 wherein the oxy-ether is tetrahydrofuran.

References Cited by the Examiner

UNITED STATES PATENTS

| | | | |
|---|---|---|---|
| 2,688,011 | 8/1954 | Wheatley et al. | 260—78 |
| 3,006,899 | 10/1961 | Hill et al. | 260—78 |
| 3,109,836 | 11/1963 | Berry | 260—78 |

OTHER REFERENCES

Colonge et al.: Societe Chimique de France, T22, January 1955.

WILLIAM H. SHORT, *Primary Examiner.*